United States Patent
Lee et al.

(10) Patent No.: US 7,588,482 B2
(45) Date of Patent: Sep. 15, 2009

(54) APPARATUS AND METHOD FOR MANUFACTURING LIQUID CRYSTAL DISPLAY DEVICE

(75) Inventors: Soo-chan Lee, Cheonan-si (KR); Young-il Kim, Gwacheon-si (KR); Sang-myung Byun, Cheonan-si (KR); Shi-joon Sung, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 86 days.

(21) Appl. No.: 11/624,322

(22) Filed: Jan. 18, 2007

(65) Prior Publication Data
US 2008/0034797 A1 Feb. 14, 2008

(30) Foreign Application Priority Data
Jan. 19, 2006 (KR) .................... 10-2006-0005672

(51) Int. Cl.
*B24B 1/00* (2006.01)
(52) U.S. Cl. ............... 451/41; 451/54; 451/57; 451/65; 451/159; 451/278; 451/287
(58) Field of Classification Search ............ 451/41, 451/44, 54, 57, 58, 65, 159, 278, 279, 285, 451/287
See application file for complete search history.

(56) References Cited

U.S. PATENT DOCUMENTS

| 6,736,705 | B2 * | 5/2004 | Benning et al. | 451/41 |
| 6,932,677 | B2 * | 8/2005 | Nakano et al. | 451/41 |
| 7,070,703 | B2 * | 7/2006 | Benning et al. | 216/89 |
| 2002/0068514 | A1 * | 6/2002 | Margaria | 451/44 |
| 2005/0130386 | A1 * | 6/2005 | Watanabe et al. | 438/401 |

FOREIGN PATENT DOCUMENTS

| JP | 2005-128085 | 5/2005 |
| KR | 1020030025792 A | 3/2003 |
| KR | 1020050064175 A | 6/2005 |

OTHER PUBLICATIONS

English Abstract for Publication No. 2005-128085.
English Abstract for Publication No. 1020030025792 A.
English Abstract for Publication No. 1020050064175 A.

* cited by examiner

*Primary Examiner*—Eileen P. Morgan
(74) *Attorney, Agent, or Firm*—F. Chau & Assoc., LLC

(57) ABSTRACT

An apparatus for manufacturing a liquid crystal display (LCD) device includes a table receiving an LCD panel thereon, a first grinding part grinding a surface of the LCD panel to a first surface roughness, a second grinding part grinding the surface of the LCD panel grinded to the first surface roughness to a second surface roughness, wherein the second surface roughness is smoother than the first surface roughness, and a polishing part polishing the surface of the LCD panel which is grinded to the second surface roughness.

20 Claims, 7 Drawing Sheets

APPARATUS AND METHOD FOR MANUFACTURING LIQUID CRYSTAL DISPLAY DEVICE

CROSS-REFERENCE TO RELATED APPLICATION

This application claims priority to Korean Patent Application No. 2006-0005672, filed on Jan. 19, 2006, the disclosure of which is incorporated herein by reference in its entirety.

BACKGROUND OF THE INVENTION

1. Technical Field

The present disclosure relates to an apparatus and a method for manufacturing a liquid crystal display (LCD) device, and more particularly, to an apparatus and a method for manufacturing a liquid crystal display (LCD) device having substrates with reduced thicknesses.

2. Discussion of the Related Art

An LCD device comprises an LCD panel including a first substrate where thin film transistors (TFTs) are formed, a second substrate facing the first substrate, and a liquid crystal layer interposed between the first and second substrates.

To reduce a thickness of the LCD panel, thicknesses of the first and second substrates can be reduced. However, if the first and second substrates are not thick enough initially, the substrates may be bent or damaged in a subsequent manufacturing process. Thus, to reduce the thickness of the LCD panel, the LCD panel is formed with substrates, whose thicknesses are reduced after the manufacturing process in which they may be bent or damaged.

An etching method and a wrapping method can be used to decrease the thickness of a glass substrate. The etching method uses an etching solution such as fluoric acid to decrease the thickness of the glass substrate. The wrapping method presses both surfaces of the glass substrate as a mother substrate at the same time to decrease the thickness of the glass substrate.

However, the etching method may cause a surface of the glass substrate to be coarse such that the light transmittance can be decreased. The etching method may cause the corrosion of signal wirings. Further, manufacture of the glass substrate can foe cumbersome with the etching method. Since the wrapping method is performed with the mother substrate, large-scaled equipment is used. Thus the manufacture of the LCD panel is cumbersome with the wrapping method.

SUMMARY OF THE INVENTION

An apparatus for manufacturing a liquid crystal display (LCD) device in accordance with an embodiment of the present invention, includes a table receiving an LCD panel thereon, a first grinding part grinding a surface of the LCD panel to a first surface roughness, a second grinding part grinding the surface of the LCD panel grinded to the first surface roughness to a second surface roughness which is smoother than the first surface roughness, and a polishing part polishing the surface of the LCD panel which is grinded to the second surface roughness.

The first grinding part and the second grinding part each may comprise a grinding head which grinds the surface of the LCD panel by friction, and the grinding head includes a diamond wheel to increase grinding intensity.

The first grinding part and the second grinding part each may comprise a grinding driving part which comprises a rotating driving member rotating the grinding head in parallel with the surface of the LCD panel and a revolving driving member revolving the grinding head in parallel with the surface of the LCD panel in order to grind the surface of the LCD panel uniformly.

The polishing part may include a polishing head polishing the surface of the LCD panel by friction with the surface of the LCD panel, and a polishing driving part which comprises a rotating driving member rotating the polishing head in parallel with the surface of the LCD panel and a revolving driving member revolving the polishing head in parallel with the surface of the LCD panel to grind the surface of the LCD panel uniformly.

The polishing part may include a first polishing part, and a second polishing part facing the first polishing part with the LCD panel interposed therebetween to improve a manufacturing efficiency of the LCD device by grinding both surfaces of the LCD panel at the same time.

The apparatus further may include a coupling part holding at least opposite edges of the LCD panel disposed between the first polishing part and the second polishing part.

The apparatus further may include a table rotating part sequentially carrying the LCD panel positioned on the table to the first grinding part, the second grinding part and the polishing part to reduce a movement distance.

The table may include at least one of a vacuum chuck and an electrostatic chuck which holds the LCD panel to prevent the LCD panel from moving in the process of grinding and polishing.

The apparatus may further include a reversely rotating part which turns the LCD panel with respect to an axis parallel to a surface of a floor.

The apparatus further may include a passivation layer forming part which forms a passivation layer along the edge of the LCD panel to prevent water or impurities from penetrating into a signal wiring and other components formed on a non-display region of the LCD panel and to prevent the signal wiring and the other components from, being corroding due to the water or impurities in the process of grinding or polishing.

The apparatus may further include a panel carrying part which positions the LCD panel on the table or removes the LCD panel from, the table.

A method for manufacturing an LCD device in accordance with an embodiment of the present invention, includes positioning an LCD panel on a table, grinding a first surface of the LCD panel to a first surface roughness, grinding the first surface of the LCD panel grinded to the first surface roughness to a second surface roughness which is smoother than the first surface roughness, and polishing the first surface of the LCD panel grinded to the second surface roughness.

The method may further include, after the polishing, turning the LCD panel, grinding a second surface of the LCD panel to a third surface roughness, grinding the second surface of the LCD panel grinded to the third surface roughness to a fourth surface roughness which is smoother than the third surface roughness, and polishing the second surface of the LCD panel grinded to the fourth surface roughness to reduce thickness of both surfaces of the LCD panel.

The method may further include forming a passivation layer along the edge of the LCD panel before grinding the first surface of the LCD panel to the first surface roughness, and removing the passivation layer after polishing the second surface of the LCD panel prevent water or impurities from penetrating into signal wiring and other components formed on a non-display region of the LCD panel and to prevent the signal wiring and the other components from being corroding due to the water or impurities in the process of grinding or polishing.

The method may further include turning the LCD panel between the polishing and the removing the passivation layer to facilitate removal of the passivation layer.

The method may further include cleaning and drying the LCD panel after the removing the passivation layer to remove water and impurities remaining in the LCD panel.

A method for manufacturing an LCD device in accordance with an embodiment of the present invention, includes positioning an LCD panel on a table, grinding a first surface of the LCD panel to a first surface roughness, grinding the surface of the LCD panel grinded to the first surface roughness to a second surface roughness which is smoother than the first surface roughness, turning the LCD panel, grinding a second surface of the LCD panel to a third surface roughness, grinding the second surface of the LCD panel grinded to the third surface roughness to a fourth surface roughness which is smoother than the third surface roughness, and polishing the first and second surfaces of the LCD panel.

The method may further include forming a passivation layer along the edge of the LCD panel before the grinding the first surface of the LCD panel to the first surface roughness, and removing the passivation layer after polishing the first and second surfaces of the LCD panel.

The method may further include turning the LCD panel between polishing and removing the passivation layer to facilitate removal of the passivation layer.

The polishing can be performed on the first and second surfaces of the LCD panel at the same time.

The method may further include cleaning and drying the LCD panel after the removing the passivation layer to remove water and impurities remaining in the LCD panel.

BRIEF DESCRIPTION OF THE DRAWINGS

Exemplary embodiments of the present invention can be understood in more detail from the following description taken in conjunction with the accompanying drawings of which.

DETAILED DESCRIPTION OF EXEMPLARY EMBODIMENTS

Exemplary embodiments of the present invention will be described in more detail with reference to the accompanying drawings. The present invention may, however, be embodied in many different forms and should not be construed as limited to the embodiments set forth herein.

Figure 1:
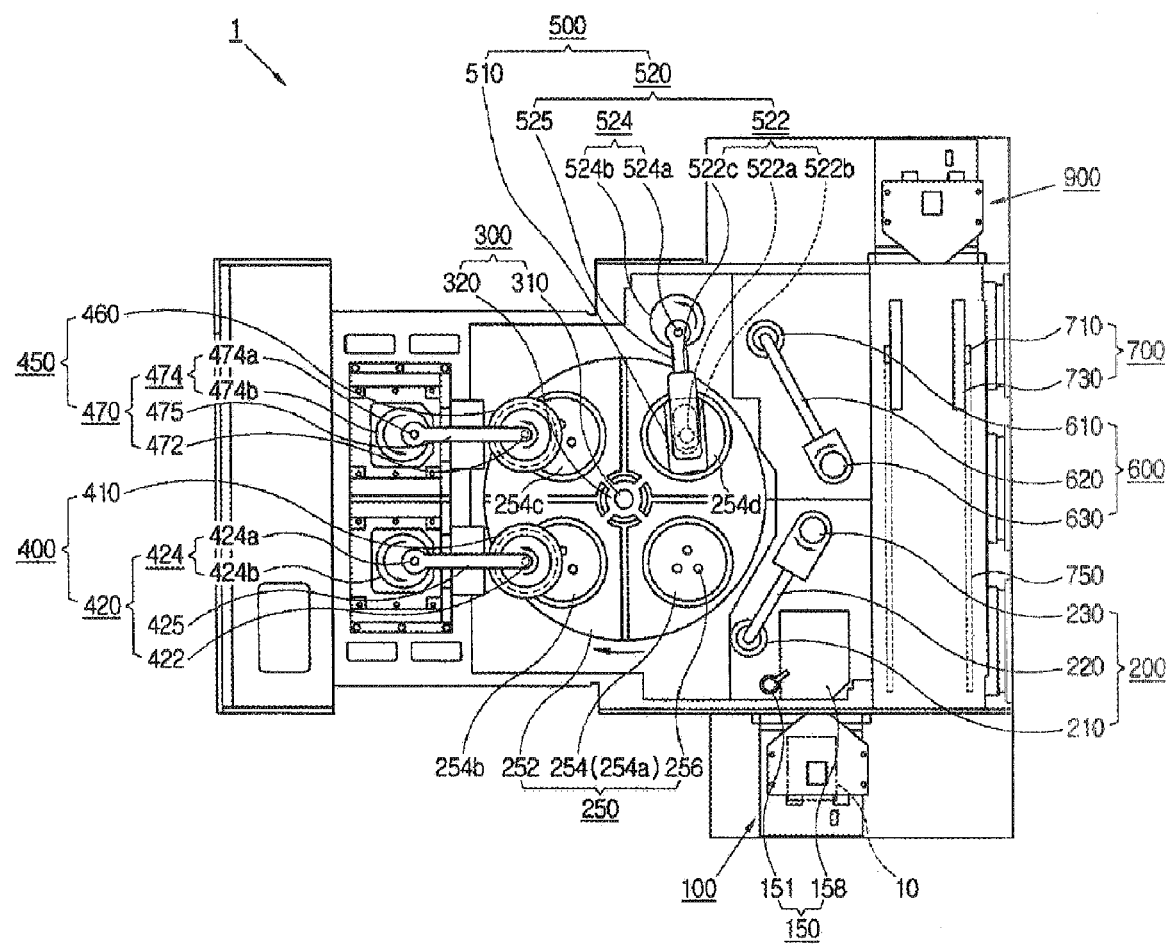
FIG. 1 is a plan view of an apparatus for manufacturing an LCD device according to an embodiment of the present invention.
Figure 2:
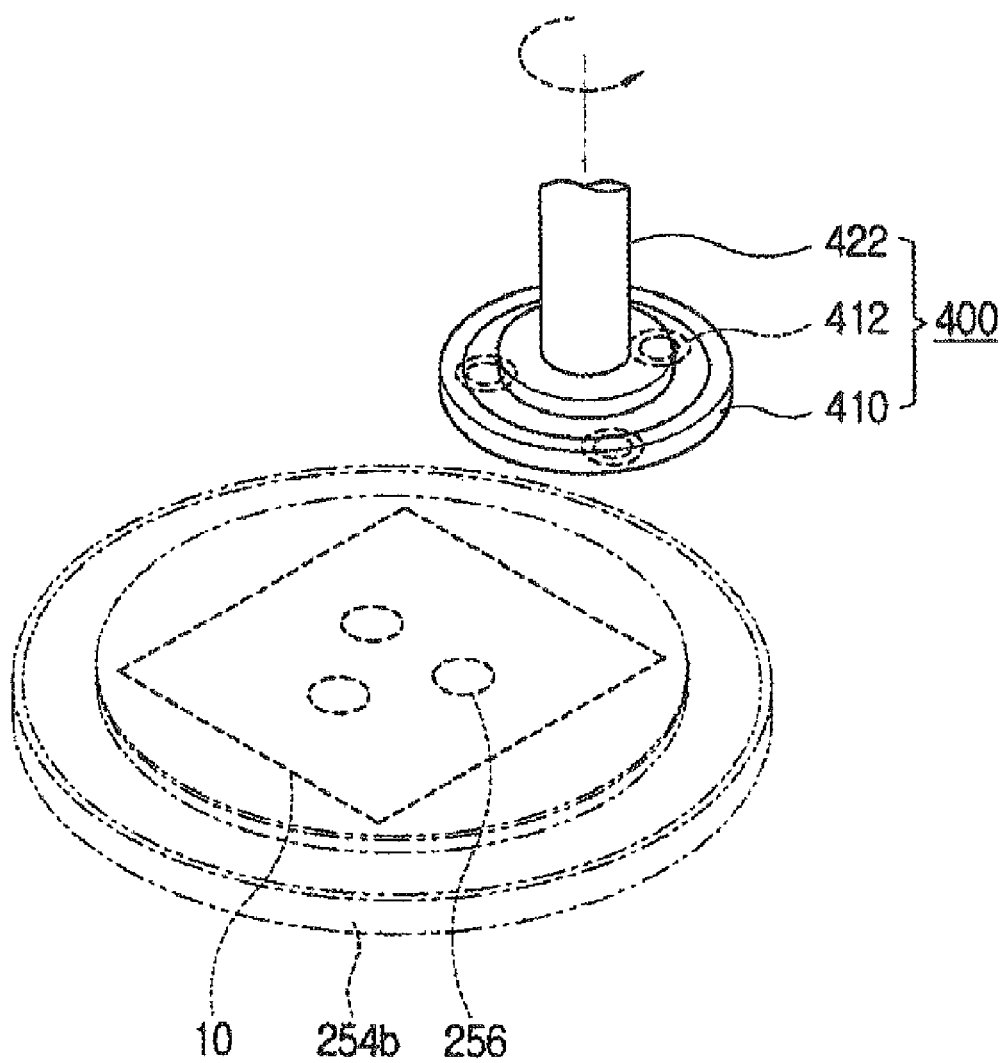
FIG. 2 is a perspective view of a first grinding part of the apparatus according to an embodiment of the present invention.
Figure 3:
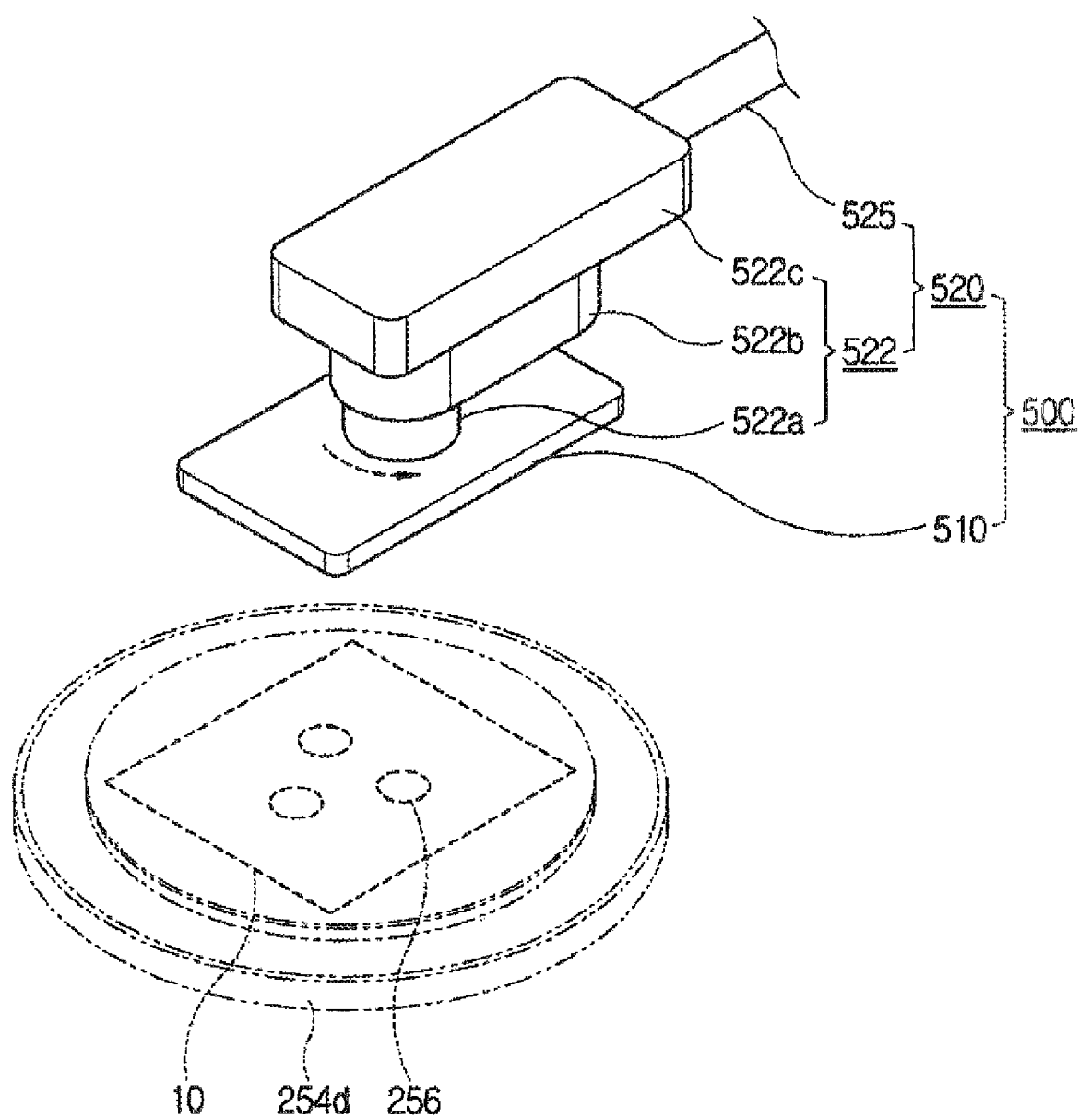
FIG. 3 is a perspective view of a polishing part of the apparatus according to an embodiment of the present invention.

An apparatus for manufacturing an LCD device according to an embodiment of the present invention is described with reference to FIGS. 1 through 3. FIG. 1 is a plan view of an apparatus for manufacturing an LCD device according to an embodiment of the present invention. FIG. 2 is a perspective view of a first grinding part of the apparatus according to an embodiment of the present invention. FIG. 3 is a perspective view of a polishing part of the apparatus according to an embodiment of the present invention.

An apparatus 1 for manufacturing an LCD device according to an embodiment of the present invention comprises a panel injecting part 100, a passivation layer forming part 150, a first panel carrying part 200, a table 250, a table rotating part 300, a first grinding part 400, a second grinding part 450, a polishing part 500, a second panel carrying part 600, a reversely rotating part 700, and a panel ejecting part 900.

An LCD panel 10 is carried from the outside and is initially positioned on the panel injecting part 100. The LCD panel 10 may comprise, for example, a glass substrate or a quartz substrate.

The passivation layer forming part 150 is provided at one lateral side of the panel injecting part 100. The passivation layer forming part 150 forms a passivation layer 16 (see (b) in FIG. 4) along the edge of the LCD panel 10 which is conveyed by a carrier (not shown) from the panel injecting part 100.

The passivation layer forming part 150 comprises a passivation layer forming member 151 and an arranging part 158.

The LCD panel 10 is positioned on the arranging part 158 to correspond to the passivation layer forming member 151. The passivation layer forming member 151 jets a passivation layer forming solution 17 (see (a) in FIG. 4) and cures the passivation layer forming solution 17 to form the passivation layer 16 comprising silicon.

The passivation layer forming member 151 moves along the edge of the LCD panel 10 to let the passivation layer forming solution 17 comprising silicon and a curing agent. The passivation layer forming member 151 moves along the edge of the LCD panel 10 to cure the passivation layer forming solution 17 to form the passivation layer 16.

The passivation layer 16 prevents moisture or impurities from penetrating into a signal wiring (not shown) formed in the edge of the LCD panel 10 while the LCD panel 10 is grinded and polished to decrease the thickness of the LCD panel 10. The passivation layer 16 is removed from the LCD panel 10 after finishing polishing the LCD panel 10.

The first panel carrying part 200 is disposed near the passivation layer forming member 151 and carries the LCD panel 10 with the passivation layer 16 from the arranging part 158 to the table 250. The first panel carrying part 200 comprises an absorbing part 210, a connecting bar 220 and a rotary motor 230.

The absorbing part 210 absorbs the LCD panel 10 for carrying the LCD panel 10 with the passivation layer 16 from the arranging part 158 to the table 250.

The rotary motor 230 is connected to the absorbing part 210 through the connecting bar 220. The rotary motor 230 rotates the absorbing part 210 to supply driving power to carry the LCD panel 10, held by the absorbing part 210, from the arranging part 158 to the table 250.

The LCD panel 10 with the passivation layer 16 is positioned on the table 250. The table 250 comprises a rotating plate 252 and a seating part 254.

The rotating plate 252 is clockwise rotated by 90 degrees using the table rotating part 300 connected to the center of the rotating plate 252.

The seating part 254 is formed on the rotating table 252. The LCD panel 10 with the passivation layer 16 is substantially positioned on the seating part 254 of the table 250. A vacuum chuck 256 is formed on the seating part 254 to prevent the LCD panel 10 positioned on the seating part 254 from moving while the LCD panel 10 is grinded and polished. In an embodiment of the present invention, the vacuum chuck 256 or an electrostatic chuck can be used to hold the LCD panel 10.

The seating part 254 comprises a first seating part 254a, a second seating part 254b, a third seating part 254c and a fourth seating part 254d. The seating parts 254a, 254b, 254c and 254d can be rotated 90 degrees in a clockwise direction to change positions. Thus, the LCD panel 10 positioned on each of the seating parts 254a, 254b, 254c and 254d is rotated to be grinded and polished while sequentially moving to the first grinding part 400, the second grinding part 450 and the polishing part 500.

The table rotating part 300 disposed in the center of the rotary table 252 comprises a shaft 310 and a rotating plate connecting part 320.

The shaft 310 transmits rotatory power to the rotating plate 252 through the rotating plate connecting part 320 using a driving part such as a motor. The rotating plate 252 can foe rotated 90 degrees in a clockwise direction using the shaft 310.

The first grinding part 400 extends from a lateral side of the second seating part 254b over the second seating part 254b. The first grinding part 400 comprises a grinding head 410 and a grinding driving part 420. The first grinding part 400 grinds a surface of the LCD panel 10 positioned on the second seating part 254b to a first surface roughness to decrease the thickness of the LCD panel 10.

The grinding head 410 comprises a first diamond wheel 412 on the lower surface. The first diamond wheel 412 generates grinding power by friction with one of surfaces of the LCD panel 10 positioned on the second seating part 254b.

The grinding driving part 420 comprises a rotating driving member 422, a revolving driving member 424, and a connecting part 425 connecting the rotating driving member 422 and the revolving driving member 424.

The rotating driving member 422 such as, for example, a rotary motor is disposed on the center of the grinding head 410. The rotating driving member 422 supplies driving power so that the grinding head 410 rotates in parallel with the surface of the LCD panel 10 to grind the LCD panel 10 by friction.

The revolving driving member 424 is connected to the rotating driving member 422 through the connecting part 425. The revolving driving member 424 comprises a revolving part 424a and a revolution guide groove 424b. The revolving part 424a revolves around the revolution guide groove 424b by a driving part (not shown) in parallel with the surface of the LCD panel 10. Thus, the grinding head 410 is rotated by the rotating driving member 422 and revolved by the revolving driving member 424 at the same time to grind the entire surface of the LCD panel 10 to the first surface roughness by friction. As a result, the thickness of the LCD panel 10 can be reduced.

The apparatus 1 for manufacturing the LCD device may further comprise a coolant supplier (not shown). The coolant supplier provides cooling liquid to the first grinding part 400 and the surface of the LCD panel 10 to prevent temperature increase in the grinding head 410 of the first grinding part 400 and the surface of the LCD panel 10. The temperature increase in the grinding head 410 can be caused by friction while grinding the LCD panel 10.

The second grinding part 450 is disposed on one lateral side of the first grinding part 400.

The LCD panel 10 grinded to the first surface roughness is carried by the table rotating part 300 to be disposed on the third seating part 254c. Then, the second grinding part 450 grinds the surface of the LCD panel 10 to a second surface roughness. The second surface roughness is smoother than the first surface roughness. Accordingly, a thickness of the LCD panel 10 may further decrease.

The second grinding part 450 comprises a grinding head 460 and a grinding driving part 470.

The grinding head 460 comprises a second diamond wheel (not shown). The second diamond wheel grinds the LCD panel 10, having the first surface roughness, to the second surface roughness by friction with the surface of the LCD panel 10. The second diamond wheel supplies lower grinding power than the first diamond wheel, so that the second surface roughness is less than the first surface roughness.

The grinding driving part 470 comprises a rotating driving member 472 and a revolving driving member 474. Thus, the grinding head 460 is rotated by the rotating driving member 472 and revolved by the revolving driving member 474 at the same time to grind the entire surface of the LCD panel 10 to the second surface roughness.

The apparatus 1 for manufacturing the LCD device may further comprise a coolant supplier (not shown) to provide cooling liquid to the second grinding part 450 and the surface of the LCD panel 10.

The polishing part 500 extends from one lateral side of the fourth seating part 254d over the fourth seating part 254d. The polishing part 500 flattens the surface of the LCD panel 10, which is grinded to the second surface roughness and then carried by the table rotating part 300. The polishing part 500 polishes the surface of the LCD panel to increase light transmittance.

The polishing part 500 comprises a polishing head 510 and a polishing driving part 520.

The polishing head 510 polishes the surface of the LCD panel 10 having the second surface roughness to remove the second surface roughness, thereby flattening the surface of the LCD panel 10 and increasing the light transmittance thereof. The thickness of the LCD panel 10 decreases further by polishing the LCD panel 10. The polishing head 510 may comprise, for example, metal or cesium oxide (CeO).

The polishing driving part 520 comprises a rotating driving member 522, a revolving driving member 524 and a connecting part 525 connecting the rotating driving member 522 and the revolving driving member 524.

The rotating driving member 522 comprises a shaft 522a which transmits rotatory power from a motor 522b coupled by a motor coupling part 522c to the polishing head 520.

The revolving driving member 524 comprises a revolving part 524a and a revolution guide groove 524b. Thus, the polishing head 510 is rotated by the rotating driving member 522 and revolved by the revolving driving member 524 at the same time to polish the entire surface of the LCD panel 10 to be uniform. As a result, the thickness of the LCD panel 10 can be reduced.

The apparatus 1 for manufacturing the LCD device may further comprise a slurry supplier (not shown). The slurry supplier provides slurry to the surface of the LCD panel 10 to prevent temperature increase in the polishing head 500 and the surface of the LCD panel 10. The temperature increase can be caused by friction while polishing the LCD panel 10.

The slurry supplier provides slurry to the surface of the LCD panel 10 to efficiently polish the LCD panel 10.

The second panel carrying part 600 is provided in one lateral side of the fourth seating part 254d. The second panel carrying part 600 comprises an absorbing part 610, a connecting bar 620 and a shaft 630.

The second panel carrying part 600 carries the LCD panel 10 positioned on the fourth seating part 254d to the reversely rotating part 700. The reversely rotating part 700 comprises a clamp 710 and a rotating shaft 730. After one surface of the LCD panel 10 is grinded and polished, the reversely rotating part 700 turns the LCD panel 10 to grind and polish the other surface of the LCD panel 10. Further, when both substrates of the LCD panel 10 are grinded and polished, the reversely rotating part 700 turns the LCD panel 10 so that a smaller counter substrate 14 (see FIG. 4) of the LCD panel 10 faces upward to facilitate removal of the passivation layer 16 from the LCD panel 10.

The clamp 710 clamps opposite lateral sides of the LCD panel 10 to securely support the LCD panel 10 while turning the LCD panel 10. The LCD panel 10 rotates by 180 degrees with respect to the rotating shaft 710. The rotating shaft 710 can be rotated by the driving part (not shown) while being clamped.

When the reversely rotating part 700 turns the LCD panel 10 to facilitate the removal of the passivation layer 16, the LCD panel 10 is carried to the panel ejecting part 900. Then, the passivation layer 16 is removed from the LCD panel 10. Then the LCD panel 10 is cleaned and dried before being ejected to the outside.

When the reversely rotating part 700 turns the LCD panel 10 to grind and polish the other surface of the LCD panel 10, the LCD panel 10 is carried near the first seating part 254a along a guide rail 750. The carried LCD panel 10 is positioned on the first seating part 254 by the first panel carrying part 200 to grind and polish the other surface thereof in a subsequent process.

The panel ejecting part 900 is disposed near the reversely rotating part 700. After grinding and polishing both surfaces of the LCD panel 10 while being re-turned by the reversely rotating part 700, the panel ejecting part 900 removes the passivation layer 16 from the LCD panel 10. The LCD panel 10 is then cleaned and dried. Then the LCD panel 10 is ejected to the outside.

The apparatus 1 for manufacturing the LCD device according to an embodiment of the present invention can decrease the thickness of the LCD panel 10. According to an embodiment of the present invention, a coarse surface of the glass substrate and a corrosion of signal wirings can foe prevented. As compared with the wrapping method, the apparatus 1 can use smaller-sized equipment to facilitate carrying and treatment of the LCD panel 10, and may perform a continuous process to reduce manufacturing time.

Figure 4:
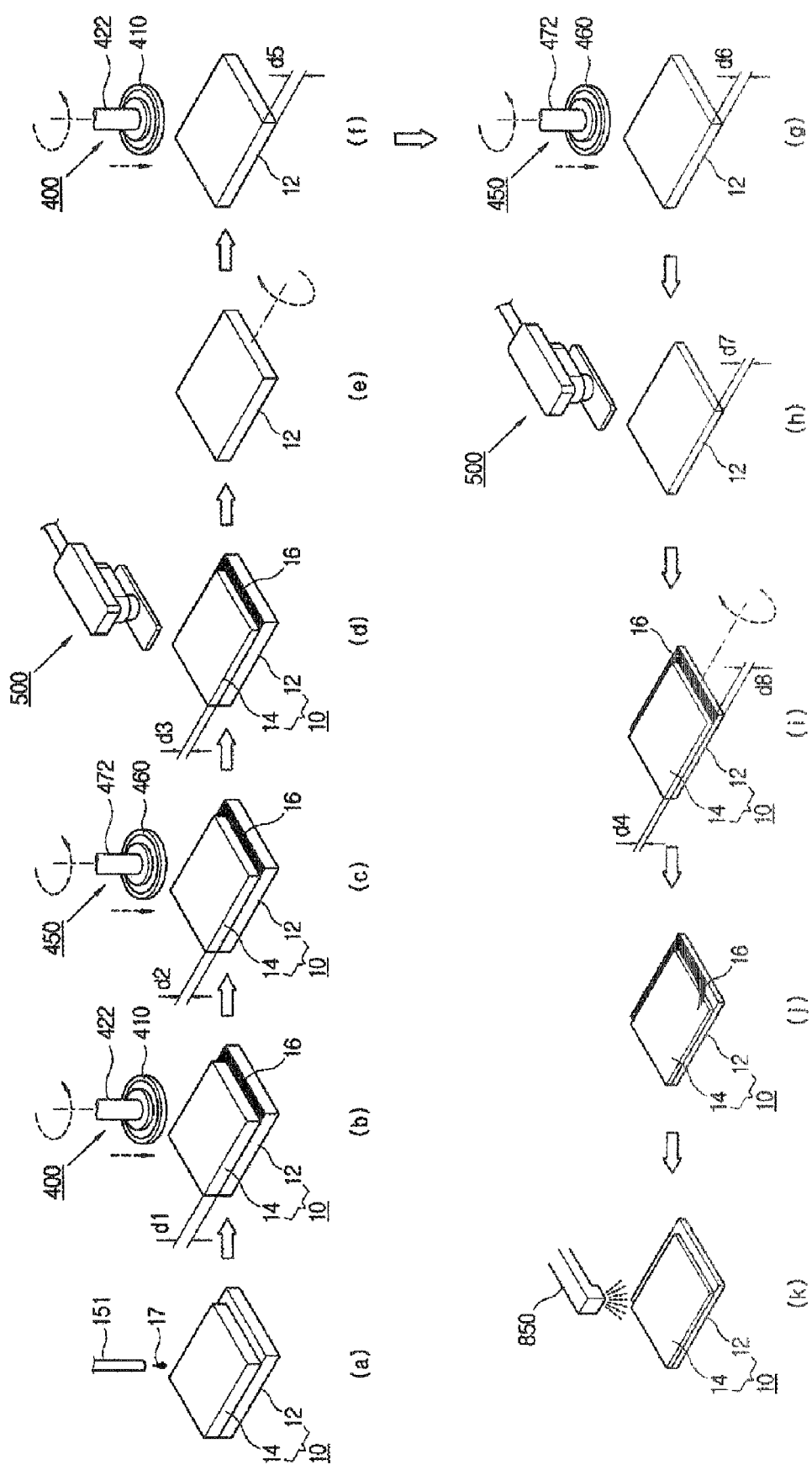
FIG. 4 is a perspective view to illustrate a method of manufacturing an LCD device according to an embodiment of the present invention.

A method for manufacturing an LCD device according to an embodiment of the present invention is described with reference to FIGS. 1 through 4. FIG. 4 is a perspective view to sequentially illustrate a method for manufacturing an LCD device according to an embodiment of the present invention.

A method for manufacturing an LCD device according to an embodiment of the present invention is described as follows. The LCD panel 10 is positioned on the panel injecting part 100 in such a manner that a counter substrate 14 of the LCD panel 10 which is smaller than a TFT substrate 12 thereof faces upward. The LCD panel 10 is carried from the panel injecting part 100 to the arranging part 158 of the passivation layer forming member 150. The passivation layer forming member 150 jets the passivation layer forming solution 17 along the edge of the LCD panel 10 and cures the passivation layer forming solution 17 to form the passivation layer 16, as shown in (a) of FIG. 4.

The first panel carrying part 200 carries the LCD panel 10 with the passivation layer 16 from the arranging part 158 to the first seating part 254a of the table 250 on which the LCD panel is positioned. The rotating plate 252 of the table 250 is rotated by 90 degrees by rotation of the shaft 310 of the table rotating part 300, so that the first seating part 254a moves to the position where the second seating part 254b was originally disposed.

Referring to (b) of FIG. 4, the first grinding part 400 grinds the surface of the counter substrate 14 of the LCD panel 10, positioned on the first seating part 254a and having a thickness of d1, to the first surface roughness. Then, the counter substrate 14 has a thickness of d2, which is smaller than d1, as shown in (c) of FIG. 4. The rotating plate 252 of the table 250 is further rotated by 90 degrees by rotation of the shaft 310 of the table rotating part 300, so that the first seating part 254a moves to the position where the third seating part 254b was originally disposed.

Referring to (c) of FIG. 4, the second grinding part 450 grinds the surface of the counter substrate 14 of the LCD panel 10, positioned on the first seating part 254a and having the thickness of d2 and the first surface roughness, to the second surface roughness. The second surface roughness is smoother than the first surface roughness. Then, the counter substrate 14 has a thickness of d3, which is smaller than d2, as shown in (d) of FIG. 4.

The first grinding part 400 may control grinding time or/and grinding intensity, thereby causing the counter substrate 14 to have various thicknesses. Further, the second grinding part 450 may control grinding time or/and grinding intensity, thereby causing the counter substrate 14 to have various thicknesses. Consequently, the counter substrate 14 may have various thicknesses.

If the counter substrate 14 is grinded independently of the first surface roughness and of the second surface roughness, the counter substrate 14 can be polished with reduced time.

Thereafter, the rotating plate 252 of the table 250 is rotated by 90 degrees by rotation of the shaft 310 of the table rotating part 300, so that the first seating part 254a moves to the position where the fourth seating part 254d was originally disposed.

Referring to (d) of FIG. 4, the polishing part 500 polishes the surface of the counter substrate 14 having the thickness of d3 and the second surface roughness. Then, the counter substrate 14 has a thickness of d4, which is smaller than d3, as shown in (i) of FIG. 4.

The polished LCD panel 10 is carried to the reversely rotating part 700 by the second panel carrying part 600. The reversely rotating part 700 turns the LCD panel 10 so that the TFT substrate 12 faces upward, as shown in (e) of FIG. 4. The LCD panel 10 moves to one lateral side of the first panel carrying part 200 as the reversely rotating part 700 moves along the guide rail 750. The rotating plate 252 of the table 250 is rotated by 90 degrees by rotation of the shaft 310 of the table rotating part 300, so that the first seating part 254a returns to the original position. Accordingly, the LCD panel 10 with the TFT substrate 12 facing upward is positioned on the first seating part 254a by the first panel carrying part 200.

Then, the rotating plate 252 of the table 250 is rotated by 90 degrees by rotation of the shaft 310 of the table rotating part 300. Referring to (f) of FIG. 4, the first grinding part 400 grinds the surface of the TFT substrate 12, positioned on the first seating part 254a and having a thickness of d5, to a third surface roughness. Then, the TFT substrate 12 has a thickness of d6, which is smaller than d5, as shown in (g) of FIG. 4. The third surface roughness is substantially similar, for example equal, to the first surface roughness of the counter substrate 14. The rotating plate 252 of the table 250 is rotated by 90 degrees by rotation of the shaft 310 of the table rotating part 300, so that the first seating part 254a moves to the position where the third seating part 254c was originally disposed.

Referring to (g) of FIG. 4, the second grinding part 450 grinds the surface of the TFT substrate 12, positioned on the first seating part 254a and having the third surface roughness and the thickness of d6, to a fourth surface roughness. The fourth surface roughness is smoother than the third surface roughness. Then, the TFT substrate 12 has a thickness of d7, which is smaller than d6, as shown in (h) of FIG. 4. The fourth surface roughness is substantially similar, for example equal, to the second surface roughness of the counter substrate 14.

The first grinding part 400 may control grinding time or/and grinding intensity, thereby causing the TFT substrate 12 to have various thicknesses. Further, the second grinding part 450 may control grinding time or/and grinding intensity, and thus the TFT substrate 12 may have various thicknesses. Consequently, the TFT substrate 12 may have various thicknesses.

Then, the rotating plate 252 of the table 250 is rotated by 90 degrees by rotation of the shaft 310 of the table rotating part 300, so that the first seating part 254a moves to the position where the fourth seating part 254d was originally disposed.

Referring to (h) of FIG. 4, the polishing part 500 polishes the surface of the TFT substrate 12 having the fourth surface roughness and the thickness of d7. Then, the TFT substrate 12 has a thickness of d8, which is smaller than d7, as shown in (i) of FIG. 4.

Thereafter, the second panel carrying part 600 carries the LCD panel 10 to the reversely rotating part 700. Then, the reversely rotating part 700 turns the LCD panel 10 so that the counter substrate 14 faces upward to facilitate removal of the passivation layer 16. The reversely rotating part 700 carries the turned LCD panel 10 to the panel ejecting part 900 to remove the passivation layer 16, as shown in (j) of FIG. 4. Then, a cleaning member 850 cleans the LCD panel 10 as shown in (k) of FIG. 4, and a drying member (not shown) dries the LCD panel 10 to finish decreasing the thickness of the LCD panel 10.

In an embodiment, thicknesses of both substrates 12 and 14 of the LCD panel 10 are reduced by being grinded and polished. In an embodiment, one surface of respective substrates 12 and 14 is grinded and polished by the first grinding part 400, the second grinding part 450 and the polishing part 500. Then the passivation layer 16 is removed, and the LCD panel 10 is cleaned and dried.

An apparatus for manufacturing an LCD device according to an embodiment of the present invention is described with reference to FIGS. 5 and 6.

Figure 5:
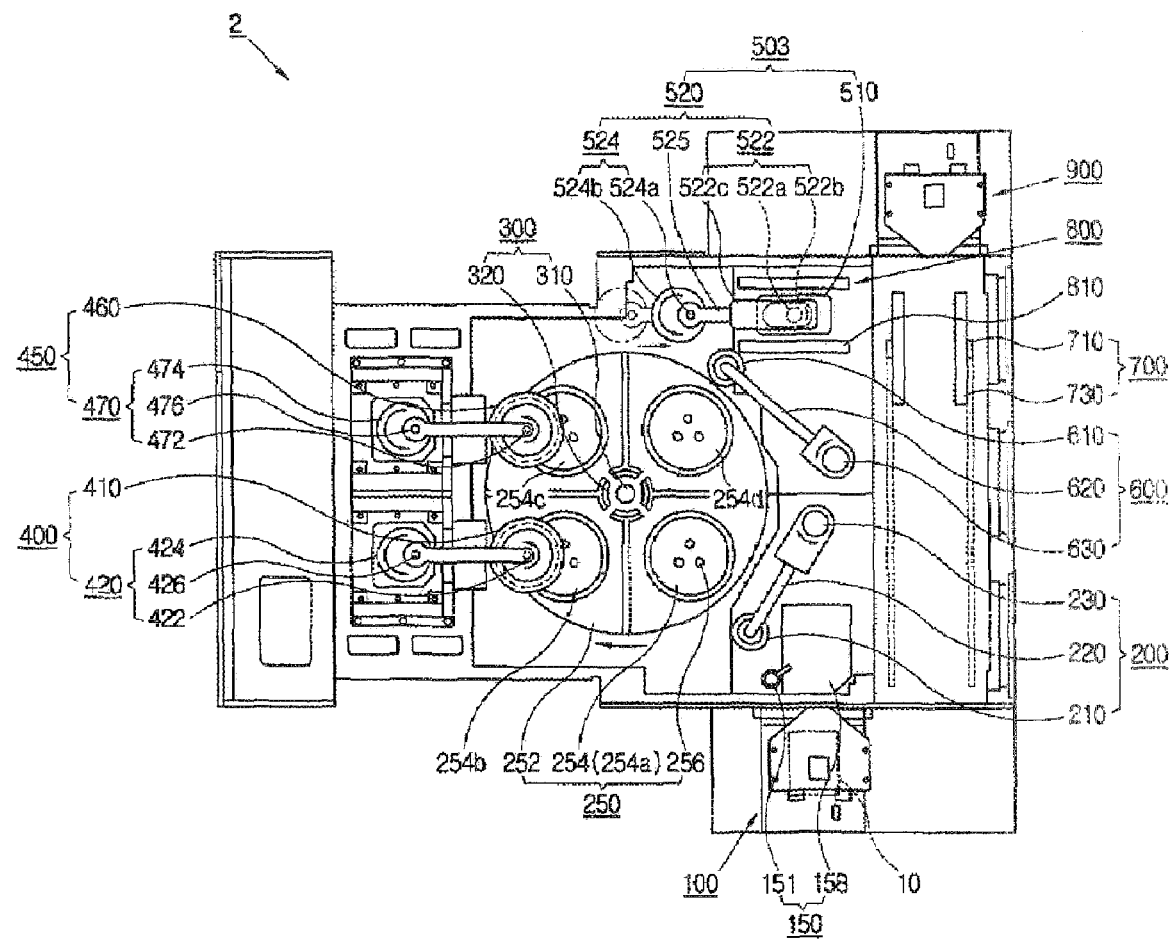
FIG. 5 is a plan view of an apparatus for manufacturing an LCD device according to an embodiment of the present invention.
Figure 6:
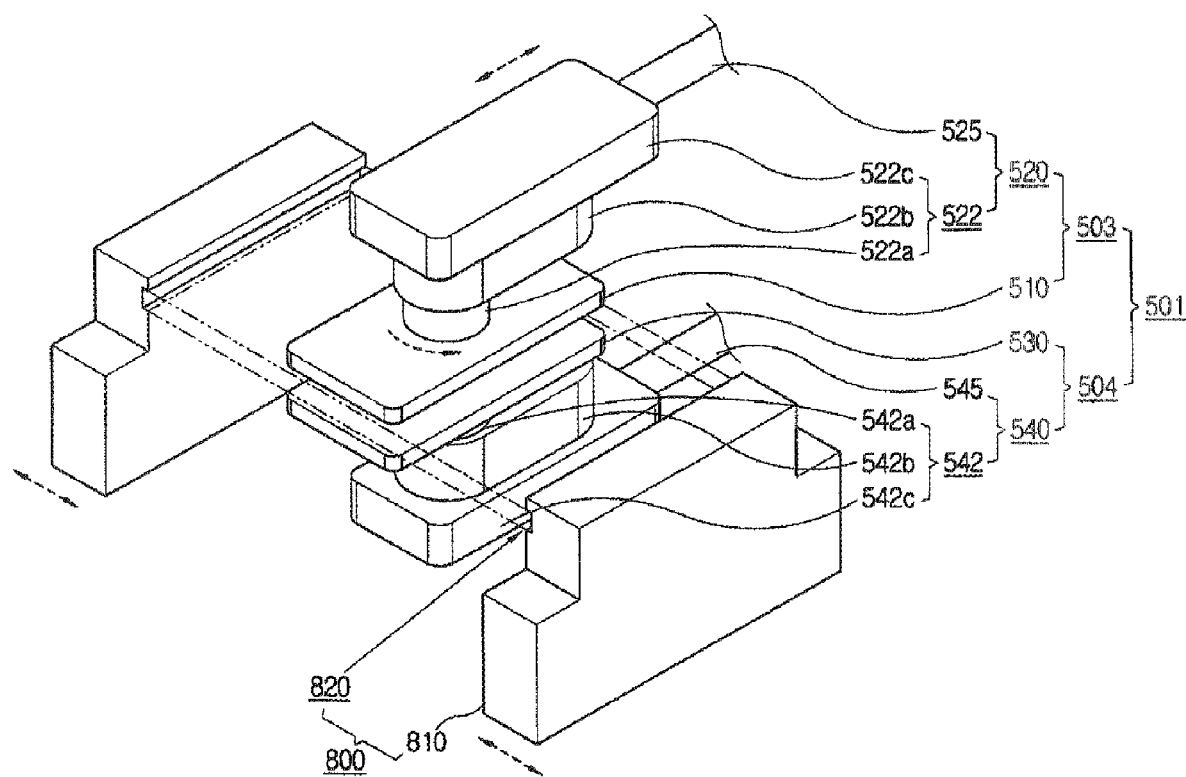
FIG. 6 is a perspective view of a polishing part of the apparatus according to an embodiment of the present invention.

FIG. 5 is a plan view of an apparatus for manufacturing an LCD device according to an embodiment of the present invention. FIG. 6 is a perspective view of a polishing part of the apparatus for manufacturing the LCD device according to an embodiment of the present invention.

An apparatus 2 for manufacturing an LCD device according to an embodiment comprises a polishing part 501 having a first polishing part 503 and a second polishing part 504 so that both surfaces of an LCD panel 10 may be polished at the same time. The second polishing part 504 is disposed opposite the first polishing part 503 with the LCD panel 10 interposed therebetween. The polishing part 501 may move toward or away from a coupling part 800.

The first polishing part 503 and the second polishing part 504 comprise respective polishing heads 510 and 530, respective rotating driving members 522 and 542, and respective revolving driving members (not shown).

It is difficult for the first polishing part 503 and the second polishing part 504 to polish both surfaces of the LCD panel 10 while the LCD panel is positioned on a seating part 254 of a table 250. Thus, the coupling part 800 holding opposite edges of the LCD panel 10 is provided near a second panel carrying part 600.

The coupling part 800 comprises a pair of bodies 810 which may be disposed close to or far from each other, and grooves 820 to accommodate the opposite edges of the LCD panel 10. The opposite edges of the LCD panel 10 carried by the second panel carrying part 600 from a fourth seating part 254d are inserted and fixed into the grooves 820.

Figure 7:
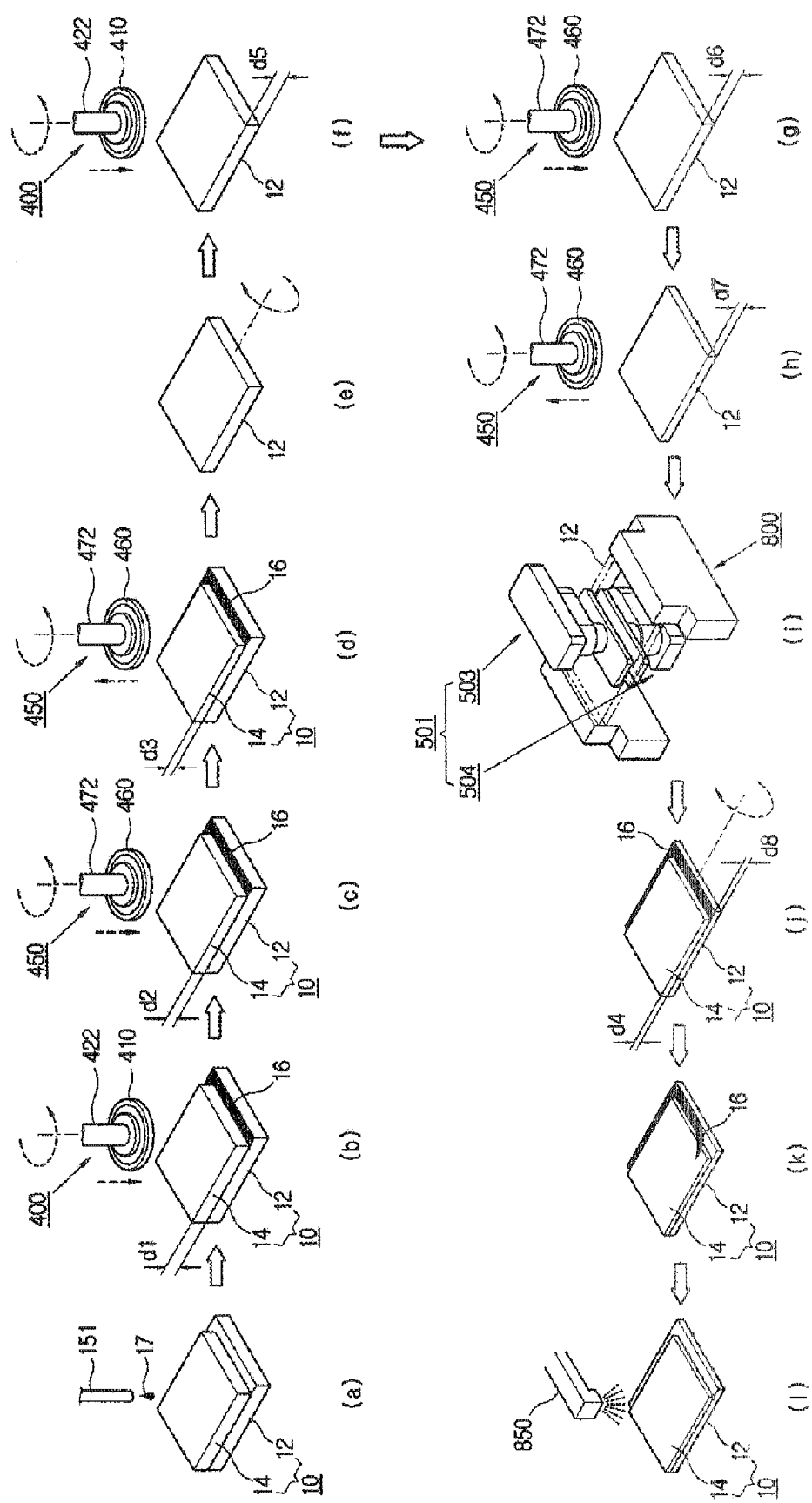
FIG. 7 is a perspective view to illustrate a method of manufacturing an LCD device according to an embodiment of the present invention.

A method for manufacturing an LCD device according to an embodiment of the present invention is described with reference FIGS. 5 through 7. FIG. 7 is a perspective view to sequentially illustrate a method for manufacturing an LCD device according to an embodiment of the present invention.

The operations of forming a passivation layer 16 along the edge of the LCD panel 10, grinding the counter substrate 14 of the LCD panel 10 by the first grinding part 400 to the first surface roughness, and grinding the counter substrate 14 by the second grinding part 450 to the second surface roughness, as shown in (a) through (c) of FIG. 4 are substantially similar to the operations as shown in (a) through (c) of FIG. 7.

A thickness of the counter substrate 14 grinded to the first surface roughness decreases from d1 shown in (b) of FIG. 7 to d2 shown in (c) of FIG. 7. A thickness of the counter substrate 14 grinded to the second surface roughness decreases from d2 shown in (c) of FIG. 7 to d3 shown in (d) of FIG. 7.

A rotating plate 252 is rotated by 90 degrees, and then a second panel carrying part 600 carries the LCD panel 10 to a reversely rotating part 700 without polishing the counter substrate 14. The reversely rotating part 700 turns the LCD panel 10 such that the TFT substrate 12 faces upward, as shown in (e) of FIG. 7. The LCD panel 10 is moved near the first panel carrying part 200 along the guide rail 750 and is positioned on the first seating part 254a.

Referring to (f) and (g) of FIG. 7, the first grinding part 400 and the second grinding part 450 grind the surface of the TFT substrate 12 to a third surface roughness and a fourth surface roughness, respectively. A thickness of the TFT substrate 12 grinded to the third surface roughness decreases from d5 shown in (f) of FIG. 7 to d6 shown in (g) of FIG. 7. A thickness of the TFT substrate 12 grinded to the fourth surface roughness decreases from d6 shown in (g) of FIG. 7 to d7 shown in (h) of FIG. 7.

The third surface roughness and the fourth surface roughness are substantially similar, for example equal, to the first surface roughness and the second surface roughness, respectively.

The rotating plate 252 is rotated by 90 degrees, and then the second panel carrying part 600 carries the LCD panel 10, which is completely grinded to the fourth surface roughness, to the coupling part 300 to hold the LCD panel 10. The first polishing part 503 and the second polishing part 504 polish both surfaces of the LCD panel 10, which is interposed therebetween and held by the coupling part 800, at the same time, as shown in (i) of FIG. 7.

The second panel carrying part 600 carries the LCD panel 10 with polished surfaces to the reversely rotating part 700. The reversely rotating part 700 turns the LCD panel 10 so that the counter substrate 14 faces upward to facilitate removal of the passivation layer 16, as shown in (j) of FIG. 7. The reversely rotating part 700 carries the LCD panel 10 to the panel ejecting part 900 to remove the passivation layer 16, as shown in (k) of FIG. 7. A cleaning member 850 cleans the LCD panel 10 as shown in (j) of FIG. 7, and a drying member (not shown) dries the LCD panel 10.

The method for manufacturing the LCD device using the apparatus 2 for manufacturing the LCD device according to an embodiment of the present invention causes the thicknesses of both substrates 12 and 14 to be reduced in less time than with conventional methods.

In exemplary embodiments, more than one of the first grinding part 400, the second grinding part 450, the polishing part 500 and the coupling part 800 can be used.

Although exemplary embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. An apparatus for manufacturing a liquid crystal display (LCD) device, comprising:
    a table receiving an LCD panel thereon;
    a first grinding part grinding a surface of the LCD panel to a first surface roughness;
    a second grinding part grinding the surface of the LCD panel grinded to the first surface roughness to a second surface roughness,
    wherein the second surface roughness is smoother than the first surface roughness; and
    a polishing part polishing the surface of the LCD panel which is grinded to the second surface roughness,
    wherein each of the first grinding part and the second grinding part comprises a grinding head which grinds the surface of the LCD panel by friction between the grinding head and the surface of the LCD panel,
    wherein each of the first grinding part and the second grinding part comprises a grinding driving part, wherein the grinding driving part comprises a rotating driving member connected to the grinding head to rotate the grinding head in parallel with the surface of the LCD panel and a revolving driving member connected to the rotating driving member through a connecting part to revolve the grinding head in parallel with the surface of the LCD panel.

2. The apparatus according to claim 1, wherein the grinding head comprises a diamond wheel.

3. The apparatus according to claim 1, wherein the polishing part comprises:
    a polishing head polishing the surface of the LCD panel by friction with the surface of the LCD panel; and
    a polishing driving part which comprises a rotating driving member rotating the polishing head in parallel with the surface of the LCD panel and a revolving driving member revolving the polishing head in parallel with the surface of the LCD panel.

4. The apparatus according to claim 1, wherein the polishing part comprises:
    a first polishing part; and
    a second polishing part facing the first polishing part with the LCD panel interposed therebetween.

5. The apparatus according to claim 4, further comprising a coupling part holding at least opposite edges of the LCD panel disposed between the first polishing part and the second polishing part.

6. The apparatus according to claim 1, further comprising a table rotating part sequentially carrying the LCD panel positioned on the table to the first grinding part, the second grinding part and the polishing part.

7. The apparatus according to claim 6, wherein, the table comprises at least one of a vacuum chuck or an electrostatic chuck holding the LCD panel.

8. The apparatus according to claim 7, further comprising a reversely rotating part which turns the LCD panel in a reverse direction with respect to an axis parallel to a surface of a floor.

9. The apparatus according to claim 8, further comprising a passivation layer forming part which forms a passivation layer along the edge of the LCD panel.

10. The apparatus according to claim 9, further comprising a panel carrying part which positions the LCD panel on the table or removes the LCD panel from the table.

11. A method for manufacturing a liquid crystal display (LCD) device, comprising:
    positioning an LCD panel on a table;
    grinding a first surface of the LCD panel to a first surface roughness by friction between the first surface of the LCD panel and a first grinding head;
    grinding the first surface of the LCD panel grinded to the first surface roughness to a second surface roughness by friction between the first surface of the LCD panel and a second grinding head, wherein the second surface roughness is smoother than the first surface roughness; and
    polishing the first surface of the LCD panel grinded to the second surface roughness,
    wherein grinding the first surface of the LCD panel to the first surface roughness comprises:
        rotating the first grinding head by rotating a first rotating driving member connected to the first grinding head; and
        revolving the first grinding head by revolving a first revolving driving member connected to the first rotating driving member through a first connecting member, and
    wherein grinding the first surface of the LCD panel to the second surface roughness comprises:
        rotating the second grinding head by rotating a second rotating driving member connected to the second grinding head; and
        revolving the first grinding head by revolving a second revolving driving member connected to the second rotating driving member through a second connecting member.

12. The method according to claim 11, further comprising:
    after the polishing, turning the LCD panel;
    grinding a second surface of the LCD panel to a third surface roughness;
    grinding the second surface of the LCD panel grinded to the third surface roughness to a fourth surface roughness, wherein the fourth surface roughness is smoother than the third surface roughness; and
    polishing the second surface of the LCD panel grinded to the fourth surface roughness.

13. The method according to claim 12, further comprising:
    forming a passivation layer along an edge of the LCD panel before grinding the first surface of the LCD panel to the first surface roughness; and
    removing the passivation layer after polishing the second surface of the LCD panel.

14. The method according to claim 13, further comprising turning the LCD panel between polishing and removing the passivation layer.

15. The method according to claim 14, further comprising cleaning and drying the LCD panel after removing the passivation layer.

16. A method for manufacturing a liquid crystal display (LCD) device, comprising:
 positioning an LCD panel on a table;
 grinding a first surface of the LCD panel to a first surface roughness by friction between the first surface of the LCD panel and a first grinding head;
 grinding the surface of the LCD panel grinded to the first surface roughness to a second surface roughness by friction between the first surface of the LCD panel and a second grinding head, wherein the second surface roughness is smoother than the first surface roughness;
 turning the LCD panel;
 grinding a second surface of the LCD panel to a third surface roughness by friction between the second surface of the LCD panel and the first grinding head;
 grinding the second surface of the LCD panel grinded to the third surface roughness to a fourth surface roughness by friction between the second surface of the LCD panel and the second grinding head, the fourth surface roughness is smoother than the third surface roughness; and
 polishing the first and second surfaces of the LCD panel, wherein at lease one of the steps of grinding the first surface of the LCD panel to the first surface roughness and grinding the second surface of the LCD panel to the third surface roughness comprises:
  rotating the first grinding head by rotating a first rotating driving member connected to the first grinding head; and
  revolving the first grinding head by revolving a first revolving driving member connected to the first rotating driving member through a first connecting member, and
 wherein at least one of the steps of grinding the first surface of the LCD panel to the second surface roughness and grinding the second surface of the LCD panel to the fourth surface roughness comprises:
  rotating the second grinding head by rotating a second rotating driving member connected to the second grinding head; and
  revolving the first grinding head by revolving a second revolving driving member connected to the second rotating driving member through a second connecting member.

17. The method according to claim 16, further comprising:
 forming a passivation layer along an edge of the LCD panel before grinding the first surface of the LCD panel to the first surface roughness; and
 removing the passivation layer after polishing the first and second surfaces of the LCD panel.

18. The method according to claim 17, further comprising turning the LCD panel between polishing and removing the passivation layer.

19. The method according to claim 18, wherein polishing is performed on the first and second surfaces of the LCD panel at the same time.

20. The method according to claim 19, further comprising cleaning and drying the LCD panel after removing the passivation layer.

* * * * *